US008789171B2

(12) United States Patent
Osipkov et al.

(10) Patent No.: US 8,789,171 B2
(45) Date of Patent: Jul. 22, 2014

(54) MINING USER BEHAVIOR DATA FOR IP ADDRESS SPACE INTELLIGENCE

(75) Inventors: Ivan Osipkov, Bothell, WA (US); Geoffrey Hulten, Lynnwood, WA (US); John Mehr, Kenmore, WA (US); Yinglian Xie, Cupertino, CA (US); Fang Yu, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 1183 days.

(21) Appl. No.: 12/055,321

(22) Filed: Mar. 26, 2008

(65) Prior Publication Data

US 2009/0249480 A1 Oct. 1, 2009

(51) Int. Cl.
H04L 29/06 (2006.01)

(52) U.S. Cl.
USPC .......................................................... 726/22

(58) Field of Classification Search
USPC .......................................................... 726/22
See application file for complete search history.

(56) References Cited

U.S. PATENT DOCUMENTS

| 7,103,913 | B2 | 9/2006 | Arnold et al. | |
|---|---|---|---|---|
| 7,181,768 | B1 | 2/2007 | Ghosh et al. | |
| 7,516,487 | B1* | 4/2009 | Szeto et al. | 726/22 |
| 2004/0117654 | A1 | 6/2004 | Feldman et al. | |
| 2007/0025265 | A1* | 2/2007 | Porras et al. | 370/252 |
| 2007/0150949 | A1 | 6/2007 | Futamura et al. | |
| 2007/0220602 | A1* | 9/2007 | Ricks et al. | 726/22 |
| 2007/0240207 | A1 | 10/2007 | Belakhdar et al. | |
| 2007/0245420 | A1* | 10/2007 | Yong et al. | 726/23 |
| 2007/0255818 | A1 | 11/2007 | Tanzer et al. | |
| 2008/0082658 | A1* | 4/2008 | Hsu et al. | 709/224 |
| 2008/0320119 | A1* | 12/2008 | Achan et al. | 709/222 |

FOREIGN PATENT DOCUMENTS

WO 2006075825 A1 7/2006

OTHER PUBLICATIONS

Ramachandran, et al., "Revealing Botnet Membership Using DNSBL Counter-Intelligence", Proceedings of the 2nd conference on Steps to Reducing Unwanted Traffic on the Internet—vol. 2, San Jose, CA, Year of Publication: 2006, pp. 49-54.
"IBM Proventia Network Anomaly Detection System (ADS)", http://www.iss.net/products/Proventia_Network_Anomaly_Detection_System/product_main_page.html.
"Packet Vs Flow-Based Anomaly Detection", by Esphion Ltd., Published on 2005, pp. 1-11.
Burgess, "Probabilistic Anomaly Detection in Distributed Computer Networks", Science of Computer Programming, vol. 60 , Issue 1 (Mar. 2006), Year of Publication: 2006, pp. 1-26.

* cited by examiner

Primary Examiner — Michael S McNally
(74) Attorney, Agent, or Firm — Bryan Webster; Andrew Sanders; Mickey Minhas

(57) ABSTRACT

The claimed subject matter is directed to mining user behavior data for increasing Internet Protocol ("IP") space intelligence. Specifically, the claimed subject matter provides a method and system of mining user behavior within an IP address space and the application of the IP address space intelligence derived from the mined user behavior.
In one embodiment, the IP address space intelligence is formed and/or increased with information obtained from the mined user behavior data. A system of uniquely-identified users is monitored and their behavior within the IP address space is recorded. Further data is mined from estimated characteristics about the user, including the nature of the IP address the user uses to log into the service, and characterizing the IP address according to a network type.

23 Claims, 7 Drawing Sheets

MINING USER BEHAVIOR DATA FOR IP ADDRESS SPACE INTELLIGENCE

BACKGROUND

The emergence of the Internet, a network of distributed computers and computerized devices, has made a significant contribution towards the advancement of modern society, resulting in a profound impact to nearly every aspect of modern living. The unprecedented speed, versatility and capacity available through which information can be communicated and disseminated over the Internet have revolutionized the business and practice of numerous industries, and enabled the rise of entirely new fields of commerce.

Unfortunately, these very features available through the Internet have also supplied the impetus for the development of new breeds of malicious and/or immoral behavior and crimes, and enabled the criminals responsible for them. These criminals are becoming increasingly sophisticated at using the Internet infrastructure to attack web services, and are able to damage other users of the Internet through malicious activity, such as Denials of Service ("DoS"), spamming, transmitting malware (e.g., spyware, adware, trojan horses, worms), or defrauding users with phishing scams. Of particular concern is the growing use of "botnets," which greatly increase the capacity for illicit behavior.

A botnet is a term generally used to refer to a collection of compromised computers (called "zombie computers") which serve as hosts to running malicious software ("malware"), under a common command and control infrastructure. Generally, a botnet proliferates over a network autonomously and automatically, and the botnet's originator can control the group remotely, typically for nefarious purposes. The future looks even bleaker with the recent advent of Storm Worm, a trojan horse that tirelessly infects new computers, effectively building a huge collection under the control of a single group. The resulting botnet can be used to bring down any network of its choosing. These days, bot controllers are in a very powerful position and it is imperative that measures are taken to stop them.

Amassing IP intelligence is essential to current security applications, as it is estimated that between 10-100 million computers connected to the Internet are infected and part of botnets. One key method for combating botnets (and any malicious activity) is to identify Internet Protocol ("IP") addresses or machines that are owned by or under the influence of these criminals and proactively prevent them from causing damage. Unfortunately, the Internet is extremely dynamic, and thus, sophisticated criminals are able to work around these protective measures. In fact, this dynamicity is constantly exploited by botnets which constantly relocate within an IP address space without actually migrating to another computer.

One of the most difficult features to address is the fact that many bots reside on computers with dynamic IP addresses, which allow bots to escape many mitigations based on IP addresses as the bots will use IP addresses which can change every few days (or even more frequently). For example, a home computer can be connected to the Internet through an internet service provider ("ISP") with a dynamic IP address. Every time a user re-connects, the user may be given a new IP address from among a predetermined (generally large) pool of available IP addresses, which may even come from a completely different subnet. Malicious activity can be tracked to a specific IP address, and certain curative and preventative measures can be taken to address that IP address. However, such mitigations can also have unintended consequences to innocent Internet users, especially when measures are taken against an IP after the bot has managed to change its IP address (i.e., through subsequent reconnections).

SUMMARY

This Summary is provided to introduce a selection of concepts in a simplified form further described below in the Detailed Description. This Summary is not intended to identify key features or essential features of the claimed subject matter, nor is it intended to be used to limit the scope of the claimed subject matter.

The claimed subject matter is directed to mining user behavior data for increasing Internet Protocol ("IP") space intelligence. Specifically, the claimed subject matter provides a method and system of mining user behavior within an IP address space and the application of the IP address space intelligence derived from the mined user behavior.

In one embodiment, the IP address space Intelligence is formed and/or increased with information obtained from the mined user behavior data. A system of uniquely-identified users is monitored, and the behavior of the identified users within the IP address space is recorded. Additional data is mined from this behavior data including the nature of the IP address each user uses to log into the service, further allowing the characterization of the IP address according to a network type.

For users of the system who log in through a service provider that provides dynamic rather than static IP addresses, a "pool" of possible dynamic addresses a user can log in through (using this service provider) is determined by monitoring all IP addresses of other users who at some point logged in to the system in close network proximity (e.g., from the same subnet) to this user's IP address. By repeating this process and combining all the pools of possible addresses the user can log in to the system through this service provider, the system can detect if the user uses the same Internet connection by checking if the IP addresses belong to the same resulting "pool."

According to one embodiment, the network type of the user is determined by using a time series analysis of the user's activities at the determined IP address(es) of the user. By comparing the activities of the user with known features specific to the network type, the type of the network the user employs to access the Internet can be estimated to some degree of certainty. Other types of information obtainable through mining user behavior include the dynamicity of the IP address.

Another embodiment of the claimed subject matter is implemented as a method for tracking malicious behavior in a system of identified users based on the mined behavior data for an IP address space. According to this embodiment, malicious activity is identified and tracked to the IP address(es) of a user of the system. The user (or the user's system) is mapped to the identified malicious activity. Subsequent attacks can thus be prevented by limiting the user (or the computer(s) determined to belong to or used by the user) access to the system.

In another embodiment, the claimed subject matter is implemented as a system for recording user data, such as a database. The database may record the identity (in the system) of the user, the user's behavior as a series of events or actions, any IP addresses from which the user was observed to perform the recorded behavior, and the time the behavior was performed. Additional aspects of the claimed subject matter may include one or more logs which store malicious activity, and the IP addresses from which the malicious activity has been observed. By cross-referencing the various knowledge bases, at-risk users (or the computers belonging to the at-risk users) can be predicted and subsequent attacks mitigated and/or repelled.

BRIEF DESCRIPTION

DETAILED DESCRIPTION

Figure 1:
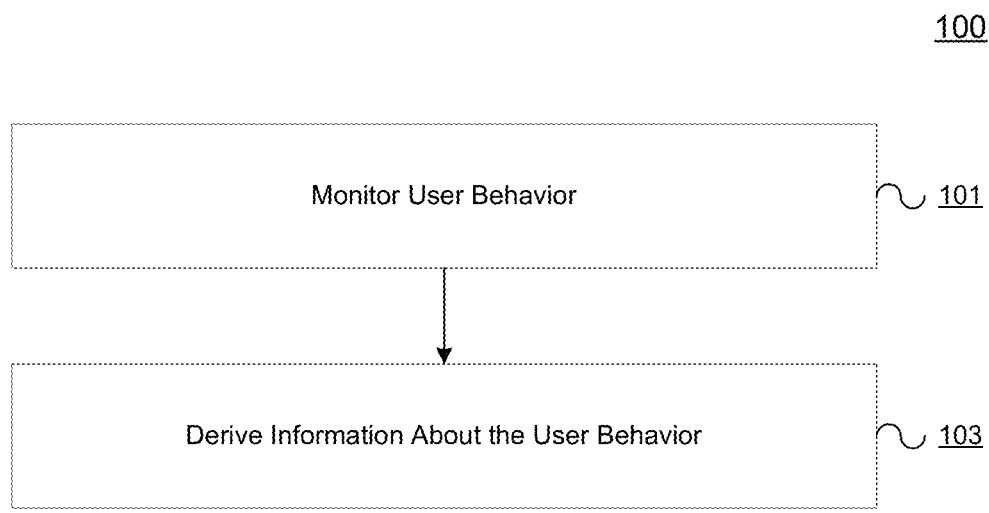
FIG. 1 depicts a flowchart describing a process for mining behavioral data from users of a system of identified users in accordance with various embodiments.

Reference will now be made in detail to the preferred embodiments of the claimed subject matter, a method and system for mining user behavior data, examples of which are illustrated in the accompanying drawings. While the claimed subject matter will be described in conjunction with the preferred embodiments, it will be understood that they are not intended to be limited to these embodiments. On the contrary, the claimed subject matter is intended to cover alternatives, modifications and equivalents, which may be included within the spirit and scope as defined by the appended claims.

Furthermore, in the following detailed descriptions of embodiments of the claimed subject matter, numerous specific details are set forth in order to provide a thorough understanding of the claimed subject matter. However, it will be recognized by one of ordinary skill in the art that the claimed subject matter may be practiced without these specific details. In other instances, well known methods, procedures, components, and circuits have not been described in detail as not to unnecessarily obscure aspects of the claimed subject matter.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the claimed subject matter, discussions utilizing terms such as "storing," "creating," "protecting," "receiving," "encrypting," "decrypting," "destroying," or the like, refer to the action and processes of a computer system or integrated circuit, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Accordingly, embodiments of the claimed subject matter provide a method and system for mining user behavior data. The claimed subject matter provides a method for compiling user behavior data for IP address space intelligence, the use of which malicious activity within the IP address space can be mapped to specific users and tracked. User behavior is recorded and compiled from a system of identified users. Specific activity is similarly recorded and tracked. Logs of specific activity and user behavior are cross-referenced to map a specific activity to a particular user. Embodiments of the claimed subject matter and its benefits are further described below.

FIG. 1 depicts a flowchart describing a process 100 for mining behavioral data from users of a system of identified users. Steps 101-103 describe exemplary steps comprising the process 100 in accordance with the various embodiments herein described.

According to the method 100 of FIG. 1, the behavior of one or more users within a system of identified users is monitored at step 101. Particular attention may be paid to behavior including activities of interest, such as confirmed malicious behavior, otherwise innocuous behavior suspected to be related to subsequent malicious behavior, or unidentified behavior similar to behavior confirmed to be malicious. An identified user could include, for example, a user with an account with an Internet web service system. A system account may comprise unique user identification (e.g., "userid," "handle," or "screen name") with means of authentication (such as a password). By logging in (i.e., accessing the system via the system's proprietary identification and authentication procedure), a user is identified by the system.

At step 103, the collected user behavior is analyzed to derive information about the behavior of users of the system. Data regarding identified users and their behavior within the system (and through the requisite IP address space) is collected (i.e., tracked and recorded) and mined to accumulate or further the IP address space intelligence available with respect to the general IP address space, specifically, though not limited to, the IP address space related to the user.

In a further embodiment, a specific user of the system is linked to activity occurring within the IP address space based on the information obtained in step 103. For an activity of interest, the collected user behavior is analyzed to characterize the IP address from which the activity was performed, the identity of the user performing the activity, and the IP address which the user uses to access the system. An activity can thus be linked to a specific user's account and the IP addresses the user utilizes to access the system. In another embodiment, some or substantially all of the IP addresses the user has used, and may use in the future (for dynamic IP addresses) are also determined. A detailed description is provided subsequently herein.

Figure 2:
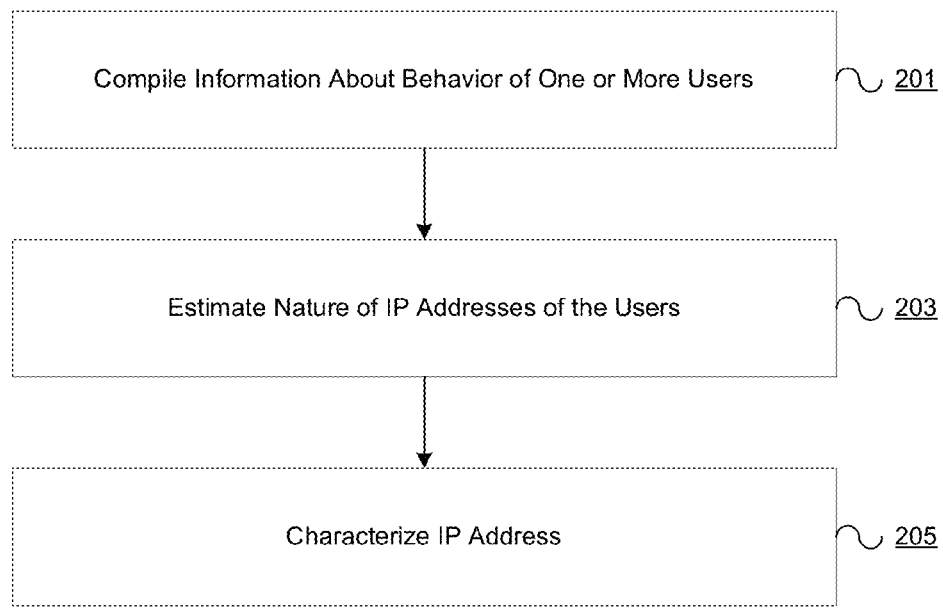
FIG. 2 depicts an exemplary flowchart describing a process for deriving information about an IP address space using information about the behavior of one or more users of a system of identified users in accordance with various embodiments.

FIG. 2 depicts an exemplary flowchart describing a process 200 for deriving information about an IP address space using information about the behavior of one or more users of a system of identified users, as provided in step 101 of FIG. 1. Steps 201-205 describe exemplary steps comprising the process 200 in accordance with the various embodiments herein described.

According to the method 200 of FIG. 2, information about the behavior of one or more users of the system (such as a web service system) within the IP address space is compiled at step 201. Compiling information about the behavior of a user may include, for example, recording the function, IP address and time of a user's activities performed over the Internet (e.g., web searches, email) while utilizing the system.

At step 203, the nature of the IP addresses the users use to access the system is estimated. The nature of the IP addresses includes whether the IP address is static or dynamic, and whether the IP address is a proxy address or the address of a NAT (network address translation) device—such as a router. The nature of the IP addresses is estimated by identifying the IP address from incoming requests and connections. For example, when a user logs in to the system, the IP address of the user's connection may be recorded.

If the IP address of a user's connection does not change with subsequent log-ins, the IP address of the user is likely static. In one embodiment, the determination of whether the IP address of a user is static or dynamic is determined by monitoring user log-ins over a period of time. If the IP address of the user's connection is different every (or substantially every) time the user logs in, and these IP addresses are close to each other (e.g., if the IP addresses are from the same routing table entry), or belong to the same dynamic pool of subnets, the IP address of the user is likely dynamic. ISPs that require a preliminary connecting "step" to be established prior to every non-contiguous period of Internet access (i.e., DSL service providers or dial-up modems) will typically have dynamic IP addresses. Service providers without a requisite preliminary connecting step may provide static IP addresses.

For users with dynamic IP addresses, the plurality of recorded IP addresses the user has used to access the system will comprise, in whole or in part, the dynamic "pool" of possible IP addresses available to the user. By determining the dynamic pool of possible IP addresses available to the user, and, depending on the size of the pool, subsequently confirming that the IP address is indeed dynamic, curative measures can be targeted with greater accuracy and efficiency. Recognition of the dynamic nature of an offending IP address linked to a user may prevent unduly (and ineffectively) restricting or prohibiting access to an innocent, subsequent user connecting with the same IP address the offending machine used to perform the malicious or undesired activity.

In a further embodiment, once the dynamic pool of possible IP addresses available to a user is determined, certain characteristics of the dynamic IP address service provider of the user can be inferred from observing behavior corresponding to other users that connect to the system with IP addresses within the same pool of IP addresses. For example, characteristics such as the "dynamicity" of an IP address provided by the service provider (i.e., how often an IP address changes), how long an unused IP address stays idle with the service provider, and how long the service provider takes to re-assign an abandoned IP to another user, can be estimated by monitoring the behavior over time of users connecting to the system from the determined pools.

A user with a static IP address may also be using a proxy server or be accessing the Internet through a NAT device. As such, for large networks using proxy servers or NAT devices, the IP address may have a large number of machines and users behind it at the same time. Accordingly, taking ameliorative measures against a proxy IP address or NAT IP address may be undesirable since all users within the local network that share the IP address to connect to the Internet would be affected as well.

A determination that the IP address is a proxy can be accomplished by monitoring the level of user activity on an IP address. Heavy user activity on a given IP may be indicative of a proxy. A key factor in this estimation is the interweaving of activities of different users on the same IP addresses. For example, if a first user is seen at an IP address at time T1 and time T2 within a limited time period, and a second user is seen between T1 and T2 at the same address, the conclusion that first and second users are behind the IP address at the same time can be reached. Using this approach, linking multiple users behind the same IP at the same time, as is the case with a proxy or a NAT device, is possible. A similar technique can be applied to a determination of an IP address projected by a NAT device (even when the IP address is dynamic).

At step 205, the IP address is characterized according to the network type. The network type may be characterized, for example, as a residence, business, mobile, etc. . . . According to one embodiment, characterization of the network type is determined by using a time series analysis of user activities at the determined IP address(es) of the user. The time series analysis comprises comparing a log of the user's activities with certain distinctions corresponding to the various network types. For example, a residential network is distinguishable from a business network through analysis of user activity periods. Pronounced, sustained activity arising on the weekends and after business hours may indicate a residential network, as opposed to a business network, which is more likely to have sustained activity during business hours through the normal work week.

User retention in mobile networks (e.g., academic institutions, cafes, airports, libraries) is commonly very low, and/or temporary and transient in nature compared to business or residential networks. Libraries, for example, user activity becomes null after closing hours. With most academic institutions, usage becomes negligible during extended holidays. Leveraging these distinctions with an analysis of usage at an IP address allows characterization of the IP address according to network type.

Figure 3:
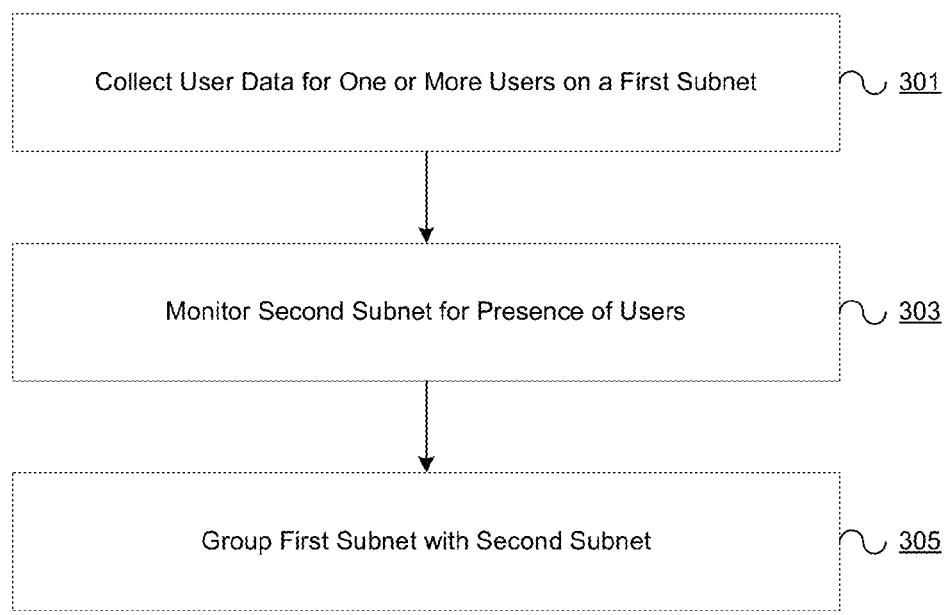
FIG. 3 depicts an exemplary flow chart depicting a process for determining a dynamic pool of Internet Protocol addresses an identified user can use to access the Internet with a dynamic Internet Protocol address in accordance with various embodiments.

FIG. 3 depicts an exemplary flow chart depicting a process 300 for determining a dynamic pool of Internet Protocol addresses an identified user can use to access the Internet with a dynamic Internet Protocol address, as provided in step 203 of FIG. 2. Steps 301-305 describe exemplary steps comprising the process 300 in accordance with the various embodiments herein described.

At step 301, the presence of a first user accessing the system on a first subnet of IP addresses is collected. Collection may include recording the times, activity, duration, and other characteristics of the access. According to one embodiment, other identified users accessing the system from the first subnet are also collected.

At step 303, the presence of the first user accessing the system from one or more new subnets of IP addresses that are not the first subnet i.e., (an IP address from another subnet other than that first subnet) is monitored and recorded. According to one embodiment, other users accessing the system from the first subnet that have been monitored to access the system from the same one or more other subnets (that is not the first subnet) as the first user are also monitored and recorded.

At step 305, for each newly obtained subnet, the other users appearing on a newly obtained subnet are recorded and, provided that a consensus amongst the users of the first subnet and the newly obtained subnet exists, the first subnet is grouped with the newly obtained subnet. The subnets which were grouped together with the first subnet form a dynamic pool of IP addresses a user can be assigned to (upon reconnection) by the user's ISP. The presence of a relatively large number of subnets in the dynamic pool can also be used as an indication that these IP addresses are indeed dynamic. Accordingly, the dynamic pool of IP addresses that the identified users use to access the system can thus be determined. Once the subnets are grouped together, the dynamic pool can be further defined by recursively examining the newly obtained subnets.

Figure 4:
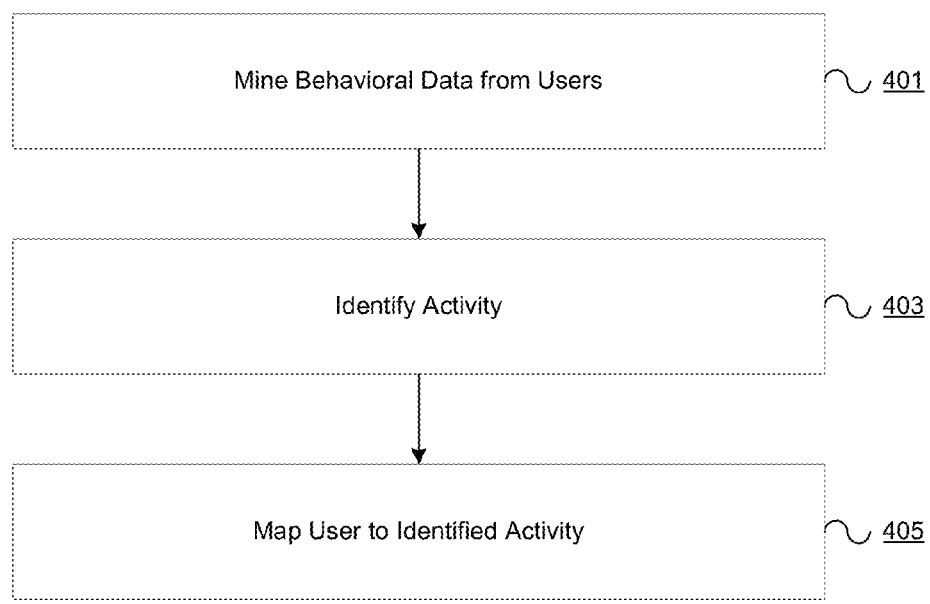
FIG. 4 depicts a flowchart describing a process for tracking behavior in a system of identified users based on mined behavior data for an IP address space in accordance with various embodiments.

FIG. 4 depicts a flowchart describing a process 400 for tracking behavior in a system of identified users based on mined behavior data for an Internet Protocol address space. Steps 401-407 describe exemplary steps comprising the process 400 in accordance with the various embodiments herein described.

At step 401, behavioral data from a system of identified users is mined by deriving information about the behavior of the users in an Internet Protocol address space. Step 401 comprises steps 101-103, as provided in the foregoing description of FIG. 1. Additional embodiments and/or detail are provided in the foregoing descriptions of FIG. 2 and FIG. 3. As such, repetition is herein omitted.

At step 403, a specific activity originating from an IP address is identified by the system. The specific activity may, for example, include suspicious or malicious activity (e.g., usage of IPs for malware distribution, Click Fraud, usage/creation of illegal system accounts, etc. . . . ). The activity may also comprise a pattern of behavior, rather than a single incident or act. Furthermore, the specific activity is not necessarily restricted to the behavioral data of one or more users as recorded in step 401. In one embodiment, the activity is flagged by the system and characteristics of the activity (e.g., the user account, IP address of the user performing the activity is recorded, the time(s) the activity occurred) are recorded.

At step 405, the activity (or series of activities) is mapped to a specific user of the system. Mapping the activity to a specific user subsequently enables tracking the bot (if applicable) misusing the user's machine and Internet access. Accordingly, once the (malicious) bot activity has been mapped to a machine of a specific user, proactive measures can be taken against the recorded IP address(es) of the user (determined at step 401) before the bot and/or user launches a subsequent attack.

Proactive measures may depend on the specific activity. For example, for Click Fraud, a proactive measure may be to surgically downgrade clicks from the IP address of the tracked user. For the fraudulent creation of system accounts, harsher policies for signups and activities can be created against the current IP addresses of the bot. For malware distribution, proactive measures may include prevention of binary/executable distribution through the system from the current IP addresses of the bot. Finally, proactive measures may be enacted to block email sent directly from the IP address to an email address in the system.

In cases where an IP address can be linked to a user, the mined behavior data allows the system a greater degree of accuracy in determining how or when a measure (curative, proactive, etc. . . . ) should be applied. For example, for malicious activity recorded at a static IP, curative or preventative measures may be appropriate for a longer period of time. Conversely, for dynamic IP addresses, the same measures may only be appropriate according to how often the IP addresses change on the network, and should only be applied appropriately.

Figure 5:
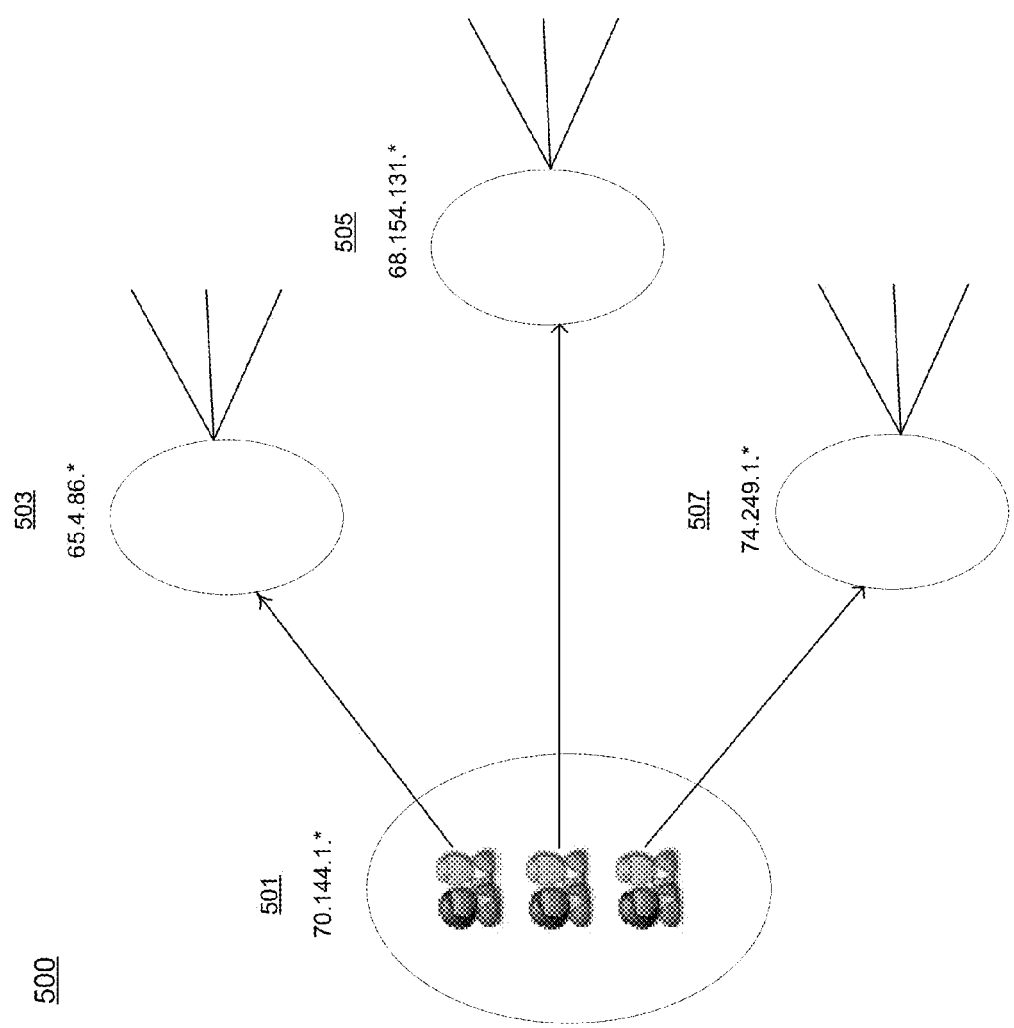
FIG. 5 depicts an exemplary pool of dynamic IP addresses that may be accessible to a user of the system through an ISP that connects through dynamic IP addresses, in accordance with various embodiments.

FIG. 5 depicts an exemplary pool 500 of dynamic IP addresses that may be accessible to a user of the system through an ISP that connects through dynamic IP addresses, in accordance with various embodiments.

According to the pool 500 of dynamic IP addresses, users seen at exemplary IP subnet 501 can also be assigned to IP addresses from completely different subnets 503, 505 and 507. Probabilistic analysis can be used to determine the level of consensus of users that should exist among subnets before one subnet is affirmatively linked to another. In one embodiment, a certain percentage of users on one subnet should also be seen on another subnet and vice versa before the subnets are affirmatively grouped to form a dynamic pool.

Figure 6:
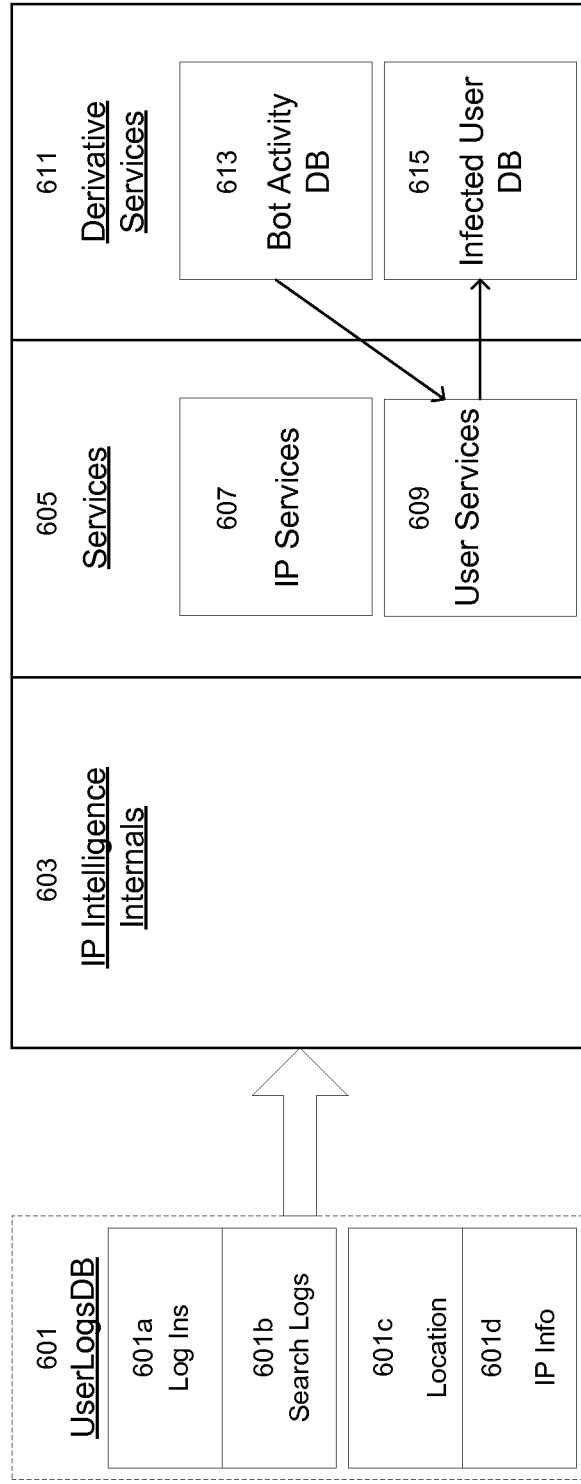
FIG. 6 depicts an exemplary system for tracking behavior in a system of identified users based on mined behavior data for an IP address space, in accordance with various embodiments.

FIG. 6 depicts an exemplary system 600 for tracking behavior in a system of identified users based on mined behavior data for an Internet Protocol address space, in accordance with various embodiments.

According to FIG. 6, the system 600 includes a UserLogsDB 601, a database of user logs. The database includes a component for the storage of user logins 601a, search logs 601b, the user's determined geo-location 601c and information regarding the IP addresses of corresponding users 601d. The database can be a log of user activity with system accounts, recording when a user logs into the system (such a web search for a search engine system), when the user performs actions through the system, and the address and geographical position of the user when the user logs in to the system and/or performs an action through the system.

The data from the UserLogsDB 601 is sent to a component for the Internal Control of IP Intelligence 603. In one embodiment, the component for the Internal Control of IP Intelligence 603 is implemented as an engine that analyzes the data from the UserLogsDB 601 and provides services 605. These provided services may include IP Services 607 and User Services 609.

The component for the Internal Control of IP intelligence 603 receives a secondary input from a Bot Activity DB 613, a database of recorded activity corresponding to known and/or suspected bot activity. According to the system 600, the database of recorded activity corresponding to known and/or suspected bot activity may be included in a separate component for derivative services 611. The component for derivative services 611 may include, in addition to the Bot Activity DB 613, a database containing the account and activity information for known infected users (Infected User DB 615). The component for derivative services 611 is used to track bots by linking the bots to specific users and subsequently tracking the users.

Included in the Bot Activity DB 613 is data which pairs an IP address with a time, indicating that there was malicious activity coming from the IP address at the specified time. This knowledge can be leveraged to attempt to map this activity to a computer owned by one of the users in the User Logs DB 601. The goal then is to find a user and determine the probability such that the user's computer was responsible for the activity. For users whose responsibility for the activity is highly probably, or for users linked to malicious activity on multiple occasions, the user can be entered into the Infected Users DB 615.

Several factors come into play when making the determination of whether malicious activity can be linked to a user. For example, for an activity performed from a proxy IP address, it is most likely that the determination cannot be made at all. Likewise, activity from a mobile IP address lowers the probability that a malicious activity can be assigned to a specific user, due to the number of possible users behind the IP address. Conversely, malicious activity emanating from a residential or business IP address (using a non-NAT, non-proxy address), can be affirmatively linked to users with some degree of certainty.

The input from the User Logs DB 601 and the Bot Activity DB 613 is analyzed and used to output a list of users of a service with the probability that the user's computer performed an identified activity (e.g., a malicious attack). For example, if a user is monitored on an IP address before and after malicious activity, for the networks with dedicated (non-NAT, non-proxy) addresses, there is a high probability that this specific user's computer launched an attack. If this network falls into a category of residential or business, there is a greater likelihood that the user also owns (or has relatively permanent access to) the computer. Accordingly, this information would afford a greater degree of precision to direct curative or preventative measures.

Figure 7:
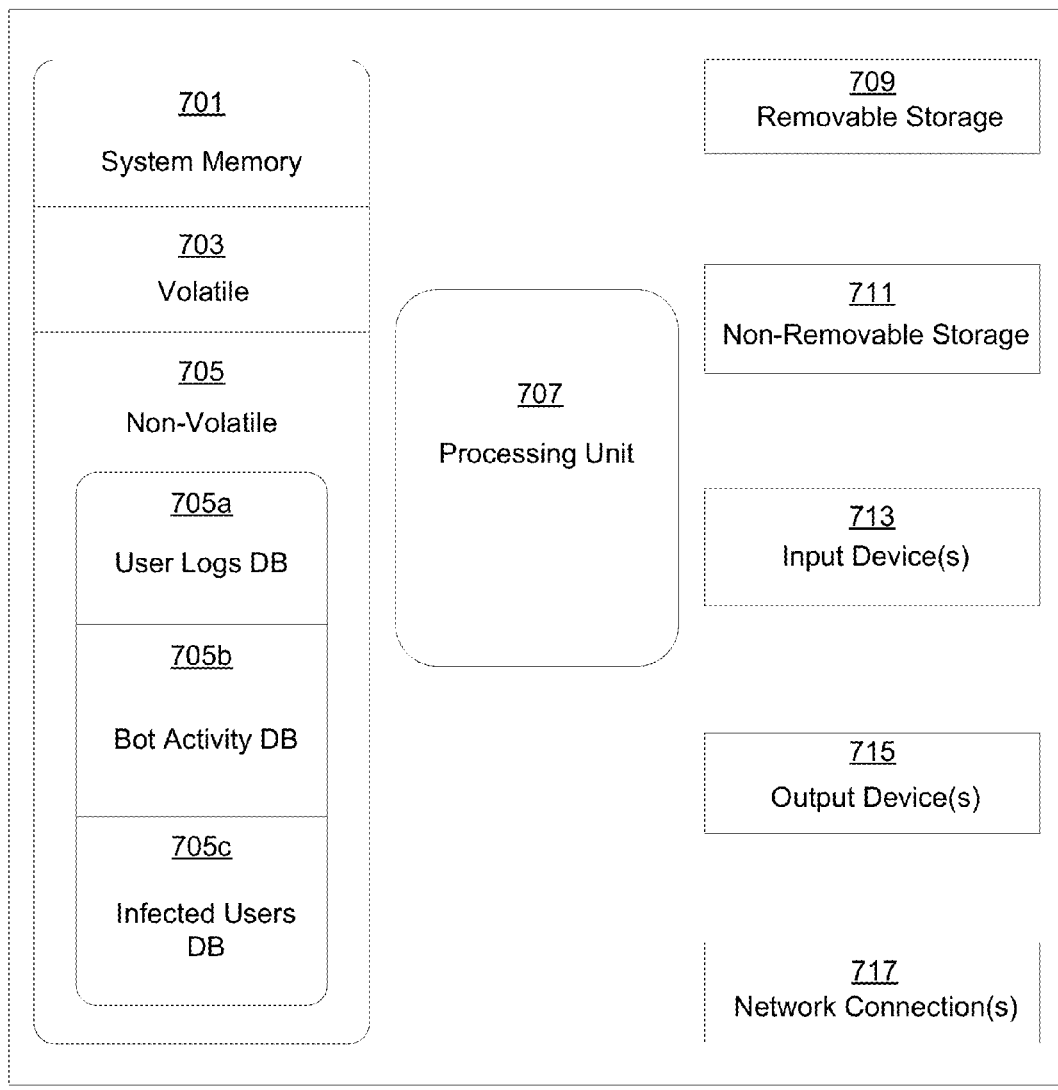
FIG. 7 shows an exemplary computing device in accordance with various embodiments.

FIG. 7 shows an exemplary computing device 700 according to various embodiments. Computing device 700 depicts the components of a basic computer system providing the execution platform for certain software-based functionality in accordance with various embodiments. Computing device 700 can be an environment upon which the system 600 for tracking behavior in a system of identified users based on mined behavior data for an Internet Protocol address space from various embodiments is instantiated. Computing device 700 can include, for example, a desktop computer system, laptop computer system or server computer system. Similarly, computing device 700 can be implemented as a handheld device (e.g., cell-phone, etc.) Computing device 700 typically includes at least some form of computer readable media. Computer readable media can be a number of different types of available media that can be accessed by computing device 700 and can include, but is not limited to, computer storage media.

In its most basic configuration, computing device 700 typically includes processing unit 707 and memory 701. Depending on the exact configuration and type of computing device 700 that is used, memory 701 can be volatile (such as RAM) 703, non-volatile 705 (such as ROM, flash memory, etc.) or some combination thereof. In one embodiment, the User Logs DB 705a, Bot Activity DB 705b and Infected User DB 705c are instantiated in the non-volatile memory 705.

In some embodiments, the system 600 may be fully or partially implemented in the volatile memory 703 of a computing device 700. In a further embodiment, the system 600 may store a knowledge base in the cache of the computing device 700. The knowledge base may, for example, contain the User Logs DB 705a, the Bot Activity DB 705b or the Infected Users DB 705c.

Additionally, computing device 700 can include mass storage systems (removable 709 and/or non-removable 711) such as magnetic or optical disks or tape. The computing device 700 can include input devices 713 and/or output devices 715 (e.g., such as a display). In addition, computing device 700 can include network connections 717 to other devices, computers, networks, servers, etc. using either wired or wireless media. As all of these devices are well known in the art, they need not be discussed in detail.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for mining behavioral data from users of a system of identified users, the method comprising:
    monitoring user behavior of the identified users in the system;
    compiling information about behavior of a user of the system within an Internet Protocol address space;
    estimating a nature of an Internet Protocol address the user uses to access the system by determining whether the Internet Protocol address is static or dynamic;
    characterizing the Internet Protocol address according to a network type,
    identifying user behavior as malicious activity; and
    performing a plurality of proactive measures against the malicious activity, each of the plurality of proactive measures being performed for a length of time, wherein which proactive measures are performed and the length of time for which a proactive measure of the plurality of proactive measures is performed are based on the nature of the Internet Protocol Address of the user,
    wherein the monitoring, the compiling, the estimating, the characterizing, the identifying, and the performing are performed in a computing system.

2. The method of claim 1, wherein estimating the nature of the Internet Protocol address used to access the system further comprises determining whether the Internet Protocol address is a proxy address or an address used by a network address translation device.

3. The method of claim 2, wherein determining if the Internet Protocol Address is the proxy address or the address used by a network address translation device further comprises evaluating heavy user activity on a given Internet Protocol Address.

4. The method of claim 1, wherein determining whether the Internet Protocol address is dynamic further comprises monitoring user log-ins over a period of time to determine dynamic pools of Internet Protocol addresses available to the user when connecting to the Internet.

5. The method of claim 4, wherein determining a dynamic pool of Internet Protocol addresses an identified user can use to access the Internet with a dynamic Internet Protocol address further comprises:
    collecting user data of a presence of the user seen on a first subnet;
    monitoring one or more second subnets for the presence of the user; and
    grouping the first subnet and the second subnets together to form the dynamic pool of Internet Protocol addresses the user can be assigned to when connecting to the Internet with the dynamic Internet Protocol address.

6. The method of claim 5, wherein grouping the first subnet and the second subnets together comprises performing probabilistic analysis to determine a level of consensus of users with a user presence on both the first and second subnets.

7. The method of claim 1, wherein characterizing the Internet Protocol address according to a network type further comprises using a time series analysis of user activities at the determined Internet Protocol address of the user.

8. The method of claim 7, wherein a time series analysis of user activities further comprises comparing a log of the user activities with certain distinctions corresponding to the various network types.

9. The method of claim 1, the method further comprising estimating dynamic characteristics related to the Internet Protocol address.

10. The method according to claim 1, wherein the proactive measures comprise preventing a user corresponding to the identified malicious activity from distributing files of a specified file type.

11. The method according to claim 1, wherein the proactive measures comprise blocking emails from being sent from the Internet Protocol Address of the user.

12. The method according to claim 1, wherein the proactive measures comprise downgrading a number of clicks received from the Internet Protocol Address of the user.

13. The method of claim 1, further comprising:
mapping the user of the system to the identified malicious activity; and
storing the user linked to malicious activity on a plurality of occasions into a database of identified infected users.

14. A method of tracking behavior in a system of identified users based on mined behavior data for an Internet Protocol address space, the method comprising:
mining behavioral data from a system of identified users by monitoring user behavior in the system and deriving information about user behavior in an Internet Protocol address space based on the monitored user behavior;
identifying one or more activities;
tracking the one or more activities to one or more Internet Protocol Address(es);
determining if the one or more Internet Protocol Address(es) are static or dynamic;
mapping the identified activity to the one or more Internet Protocol Addresses of a user, the identified activity comprising identified malicious activity; and
performing a plurality of proactive measures against the malicious activity, each of the plurality of proactive measures being performed for a length of time, wherein which proactive measures are performed and the length of time for which a proactive measure of the plurality of proactive measures is performed are based on whether the Internet Protocol Address(es) are static or dynamic,
wherein the mining, the identifying, the determining, the mapping and the performing are performed in a computer system.

15. The method of claim 14, the method further comprising recording a log of user data, the log of user data including:
an identity of the user;
one or more actions of the user;
the Internet Protocol address from which the user was observed performing an action; and
a time the action was performed.

16. The method of claim 15, the method further comprising recording a log of identified activities and the Internet Protocol addresses the activities access the system from.

17. The method of claim 16, wherein mapping a user to the identified activity from the Internet Protocol address of the user further comprises cross referencing the log of user data with the log of identified activities to determine the probability that a specific user is associated with the identified activity.

18. The method of claim 17, the method further comprising recording a log of infected users, wherein the log of infected users records the users mapped to identified malicious activity.

19. A system for tracking malicious behavior in a system of identified users based on mined behavior data for an Internet Protocol address space, the system comprising:
a computer system having a processor coupled to a memory, the memory having computer readable code, which when executed by the processor causes the computer system to implement an application for tracking user behavior in a system of identified users based on mined behavior data for the Internet Protocol address space,
wherein, the application tracks user behavior in a system by mining behavioral data from users of a system of identified users by deriving information about user behavior in the Internet Protocol address space, linking a specific user of the system to activity occurring with the Internet Protocol address space based upon the information obtained, identifying malicious activity and tracking the malicious activity to a Internet Protocol Address of a user, and mapping the user to the identified malicious activity coming from the Internet Protocol Address of the user,
wherein, deriving information about user behavior in the Internet Protocol address space comprises estimating a nature of the Internet Protocol address the user uses to access the system by determining whether the Internet Protocol address is static or dynamic,
further wherein, the application performs a plurality of proactive measures against the malicious activity, each of the plurality of proactive measures being performed for a length of time, wherein which proactive measures are performed and the length of time for which a proactive measure of the plurality of proactive measures is performed are based on whether the Internet Protocol Address(es) are static or dynamic.

20. The system according to claim 19, wherein the user accesses the system from a remote computing device.

21. The system according to claim 20, wherein the remote computing device is a computer system.

22. The system according to claim 20, wherein the remote computing device is a hand-held computing device.

23. The system according to claim 20, wherein the use accesses the system via the Internet.

* * * * *